United States Patent [19]

Razzaghi

[11] Patent Number: 5,274,492
[45] Date of Patent: Dec. 28, 1993

[54] LIGHT SPOT SIZE AND SHAPE CONTROL FOR LASER PROJECTOR

[76] Inventor: Mahmoud Razzaghi, 3740 Boyd Ave. #153, San Diego, Calif. 92111

[21] Appl. No.: 908,990

[22] Filed: Jul. 2, 1992

[51] Int. Cl.$^5$ ............................................. G02B 26/08
[52] U.S. Cl. ................................... 359/202; 359/290; 359/846
[58] Field of Search ............... 359/201, 202, 197, 223, 359/224, 226, 229, 230, 578, 579, 290, 291, 292, 846; 358/62, 214, 216, 233

[56] References Cited

U.S. PATENT DOCUMENTS

| | | | |
|---|---|---|---|
| 1,438,974 | 12/1922 | Wente | 359/224 |
| 2,920,529 | 1/1960 | Blythe | 359/224 |
| 3,425,771 | 2/1969 | McCown | 359/202 |
| 3,544,201 | 12/1970 | Fowler et al. | 359/224 |
| 3,758,199 | 9/1973 | Thaxter | 359/224 |
| 4,003,626 | 1/1977 | Reinke et al. | 359/202 |
| 4,289,379 | 9/1981 | Michelet | 359/292 |
| 4,298,247 | 11/1981 | Michelet et al. | 359/846 |
| 4,638,309 | 1/1987 | Ott | 359/291 |
| 5,004,319 | 4/1991 | Smither | 359/291 |

*Primary Examiner*—Loha Ben

[57] ABSTRACT

A device for dynamic light spot size and shape control which is particularly suitable for vector addressing laser projectors to produce texture, more complex diagrams, and better animation. The curvature of a small reflective surface is changed by a transducer according to a signal. The reflective surface changes the waist diameter and divergence of an incident laser beam. The reflected laser beam is then scanned onto a screen by a pair of galvanometers. The size and shape of the scanning spot on the screen varies with the curvature of the reflective surface. In a preferred embodiment of the invention, the reflective surface is deposited on a piezoelectric bimorph to follow the curvature of the bimorph induced by the applied signal. In a difference embodiment of the invention, a small amplitude, high speed subscanner, is used to subscan a laser beam in x and y directions. The subscanning beam is then deflected by a low speed main x-y scanner onto a projection screen. The subscanner produces a dynamic image cell in the shape of a line diagram on the screen. The main scanner scans the dynamic image cell as a light spot with variable size and shape, or positions the dynamic image cell at different places on the screen to produce more complex diagrams and better animation.

16 Claims, 1 Drawing Sheet

LIGHT SPOT SIZE AND SHAPE CONTROL FOR LASER PROJECTOR

FIELD OF THE INVENTION

This invention relates to laser beam optics and scanners, and particularly to laser projectors.

BACKGROUND OF THE INVENTION

Vector addressing laser projectors scan a laser beam by a pair of galvanometers. The scanning light spot on the projection screen is a circle with fixed diameter. As a result, only line diagrams and contours with constant line width can be produced. Also animated images have high flicker. This invention provides methods to control the size and shape of the light spot dynamically so that diagrams with texture, shading, and more complexity as well as better animation and more impressive light effects can be produced.

DESCRIPTION OF THE INVENTION

Figure 1:
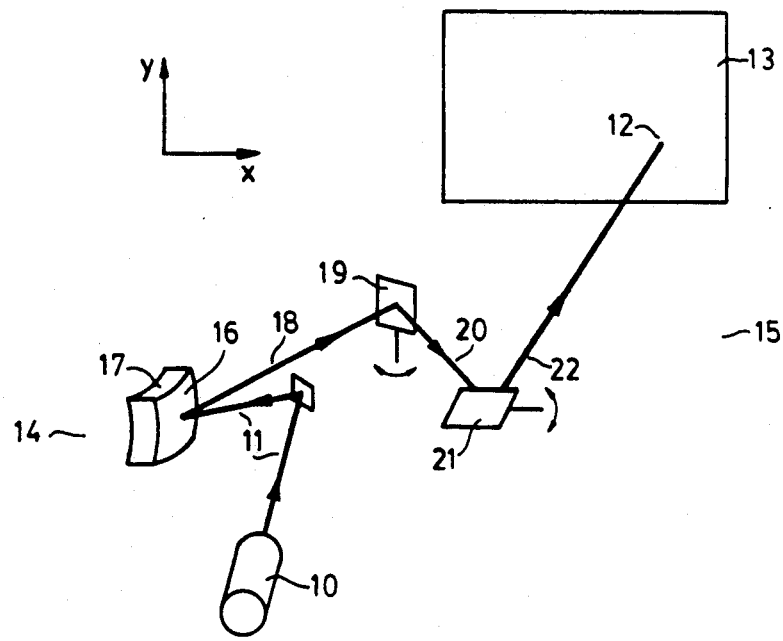
FIG. 1 is a light spot size and shape control for laser projector according to a first embodiment of the present invention.

FIG. 1 shows the first preferred embodiment of the invention. A laser light source 10 provides an essentially collimated laser beam 11 with proper size and modulation to produce a light spot 12 on a projection screen 13. A dynamic beam transforming device 14, positioned in the optical path between laser source 10 and projection screen 13, transforms laser beam 11, and accordingly, changes the size of light spot 12 on projection screen 13. An x-y scanner 15, positioned in the optical path between dynamic beam transforming device 14 and projection screen 13, deflects the laser beam and scans light spot 12 on projection screen 13.

The main feature of the first embodiment of the invention is the dynamic beam transforming device 14, which is comprised of a reflective surface 16 attached to a transducer 17. Transducer 17 changes the curvature (or focal length) of reflective surface 16 according to a signal. Dynamic beam transforming device 14 is generally a low inertia, small amplitude system to allow relatively high frequencies. Transducer 17 is preferably a piezoelectric bimorph with reflective surface 16 deposited on or attached to one of its faces. Piezoelectric bimorph bends according to a voltage applied to its electrodes.

Laser beam 11 is directed onto reflective surface 16 of beam transforming device 14 preferably at near normal incidence (or at normal incidence with the help of a beam splitter). Transducer 17 changes the curvature of reflective surface 16 according to the applied signal. Laser beam 11 is transformed and reflected by reflective surface 16 to laser beam 18. Laser beam 18 is directed onto rotating mirror 19 of scanner 15 and is deflected in x direction as laser beam 20. Laser beam 20 is directed onto rotating mirror 21 and is reflected in y direction as laser beam 22. Laser beam 22 is directed onto projection screen 13 and produces a scanning light spot 12. Since the distance between scanner 15 and projection screen 13 is relatively long, the size of light spot 12 is approximately proportional to the divergence of laser beam 18.

When reflective surface 16 is flat, the whole system functions as a conventional laser projector. By varying the curvature (or focal length) of reflective surface 16, laser beam 11 is transformed and its divergence is changed. This variation in divergence changes the size of light spot 12 on projection screen 13. In fact, reflective surface 16 produces an image of the waist of laser beam 11 with varying magnification. The divergence of transformed beam 18 varies inversely with the magnification.

The required variation in divergence has negligible effect on the beam cross section at short distances. Therefore, the size of mirrors 19 and 21 need not be greater than those used in conventional laser projectors.

Two dynamic beam transforming devices can be used in tandem to change the dimensions of light spot 12 in two independent directions. Also extra dynamic beam transforming devices may be used in tandem to implement a larger variation in spot size.

The inventor does not limit transducer 17 to a piezoelectric bimorph or any other specific transducer. As another embodiment of dynamic beam transforming device 14, transducer 17 can be an electromagnetic transducer.

Still as another embodiment of beam transforming device 14, transducer 17 can be a current carrying conductor, such as a metal stripe with constrained ends, in a magnetic field. The magnetic field bends the stripe according to the current or signal in the stripe. In this case, the conductor can also function as the reflective surface by itself.

Figure 2:
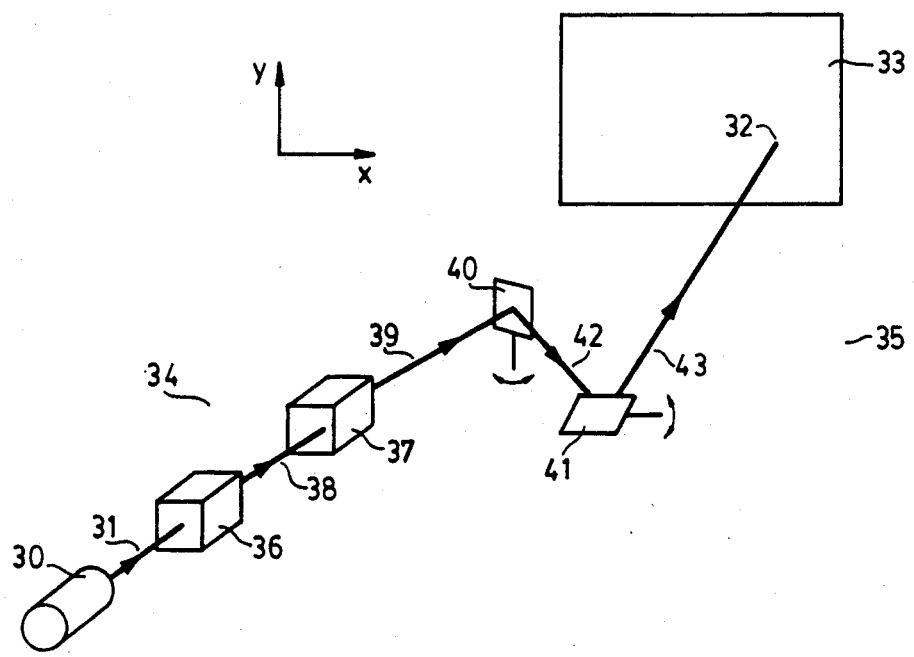
FIG. 2 is a light spot size and shape control for laser projector according to a second embodiment of the present invention.

FIG. 2 shows the second preferred embodiment of the invention. A laser light source 30 provides an essentially collimated beam of light 31 with proper size and modulation to produce a light spot 32 on a projection screen 33. A subscanner 34 is positioned in the optical path between laser source 30 and projection screen 33. A main scanner 35 is positioned in the optical path between subscanner 34 and projection screen 33. Subscanner 34 has a substantially higher speed than main scanner 35.

Laser beam 31 is directed toward subscanner 34. Subscanner 34 is comprised of preferably two electrooptic deflectors 36 and 37. Deflector 36 deflects laser beam 31 in x direction as beam 38. Deflector 37 deflects laser beam 38 in y direction as beam 39. Main scanner 35 is comprised of two galvanometer mirrors 40 and 41. Mirror 40 deflects laser beam 39 in x direction as laser beam 42. Mirror 41 deflects laser beam 42 in y direction as laser beam 43. Laser beam 43 intercepts projection screen 33 and produces a scanning light spot 32 on projection screen 33. Subscanner 34 has relatively small amplitude and high speed. Main scanner 35 has relatively large amplitude and low speed. Since the amplitude of the subscanner 34 is relatively small, the displacement of laser beam 39 is essentially negligible at short distances. Therefore, the size of mirrors 40 and 41 need not be greater than those used in conventional laser projectors.

When subscanner 34 and main scanner 35 are not scanning, the image on projection screen 33 is a stationary light spot, usually in the shape of a solid circle. More precisely, the shape and size of light spot 32 is determined by the geometry of laser beam 31 and the throw distance between main scanner 35 and projection screen 33.

When only main scanner 35 is scanning, the whole system functions as a conventional laser projector.

When only subscanner 34 is scanning, it produces a dynamic image cell, having the shape of a straight line or a line diagram, at a fixed position on projection screen 33. The size and shape of the dynamic image cell at any instant depends on the amplitude and speed of subscanner 34 in x and y directions.

When both subscanner 34 and main scanner 35 are scanning, main scanner 35 moves the dynamic image cell produced by subscanner 34 to different places on projection screen 33. The shape and size of the dynamic image cell produced by subscanner 34 is essentially unaffected by main scanner 35 due to the substantially lower speed of main scanner 35 relative to subscanner 34. In other words, high speed subscanner 34, and the movement of subscanning laser beam 39 are virtually invisible to low speed main scanner 35. Therefore, to main scanner 35, the dynamic image cell produced by subscanner 34 appears as a stationary light spot which must be scanned on the screen.

Subscanner 34 can draw a line with variable length and direction. When main scanner 35 scans this line on the screen, it produces images with shading and texture. This effect is the same as having a light spot with variable dimensions.

Main scanner 35 may also position the dynamic image cell at different places on projection screen 33 to produce complex diagrams and animation. Since the dynamic image cell covers a relatively large area, main scanner 35 needs to address fewer points on projection screen 33 as compared to a conventional laser projector. Therefore, faster image refreshes are possible for less flicker and higher level of imaging and animation.

Electrooptic deflectors are preferred for subscanner 34 because they provide efficient high speed linear scanning and do not separate colors. Galvanometers are preferred for main scanner 35 due to their efficient large angle scanning performance without color separation. However, the inventor does not limit subscanner 34 or main scanner 35 to any specific deflector.

Acoustooptic deflectors may also be used for subscanner 34. They can easily provide the required range of speed with a less demanding design relative to electrooptic deflectors.

High speed, small amplitude galvanometers may also be used for subscanner 34. They offer simple design and control. However, they generally have less flexibility in performance relative to electrooptic and acoustooptic deflectors.

I claim:

1. A laser projection system with variable light spot size, said system comprising:
    a laser light source to provide a laser beam with proper size and modulation;
    a surface used as a projection screen to receive the laser beam;
    a reflective surface positioned in the optical path between the light source and the screen;
    a transducer attached to the reflective surface to change the curvature (or focal length) of the reflective surface according to a signal; and
    an x-y scanner positioned in the optical path between the reflective surface and the screen to deflect the laser beam and direct it toward different positions on the screen;
    wherein the laser beam is directed to the reflective surface, the reflective surface changes in size, shape and divergence of the laser beam and reflects it toward the x-y scanner, the amount of change in the size, shape, and divergence of the laser beam depends on the curvature of the reflective surface induced by the signal applied to the transducer, the x-y scanner deflects the laser beam and directs it to different positions on the screen according to an addressing signal;
    whereby, the size and shape of the scanning light spot produced by the laser beam on the screen can be changed dynamically according to the signal applied to the transducer to produce diagrams with shading and texture, line diagrams with variable line thickness, and more impressive light effects.

2. The laser projection of claim 1 wherein the transducer is a piezoelectric transducer.

3. The laser projection system of claim 1 wherein the transducer is a piezoelectric bimorph and the reflective surface is deposited on or attached to one surface of the bimorph so that the reflective surface follows the variations in the curvature of the bimorph induced by the applied signal to the bimorph.

4. The laser projection system of claim 1 wherein the curvature of the reflective surface changes relative to both x and y axes so that the reflective surface transforms the laser beam in two directions, and therefore, the light spot size varies in two directions.

5. The laser projection system of claim 1 wherein the reflective surface bends along one axis into a cylindrical shape and transforms the laser beam in one direction, and therefore, the light spot size varies in said one direction.

6. The laser projection system of claim 1 further including:
    a second reflective surface positioned in the optical path between the first reflective surface and the x-y scanner; and
    a second transducer attached to the second reflective surface to change the curvature of the reflective surface according to a signal;
    wherein the first reflective surface reflects the laser beam onto the second reflective surface, the second reflective surface reflects the laser beam toward the x-y scanner, the two reflective surfaces change the size and divergence of the laser beam independently in x and y directions according to their respective curvatures;
    whereby, the dimensions of the light spot on the screen can be changed independently in x ad y directions.

7. The laser projection system of claim 1 wherein the transducer is an electromagnetic transducer.

8. The laser projection system of claim 1 wherein the x and y axes are perpendicular to each other.

9. The laser projection system of claim 1 wherein the x and y axes have an arbitrary angle relative to each other.

10. A laser projection system with a dynamic image cell as an imaging tool, said system comprising:
    a laser light source to provide a laser beam with proper diameter and modulation;
    a surface used as a projection screen to receive the laser beam;
    a main x-y scanner positioned in the optical path between the laser source and the screen to deflect the laser beam and direct it toward different positions on the screen; and a subscanner, having a scanning speed which is substantially higher than the scanning speed of the main scanner, positioned in the optical path between the laser source and the main scanner, to scan the laser beam in x and y directions;

wherein the laser beam from the laser source is deflected and scanned repeatedly by the subscanner, the subscanning laser beam is then deflected by the main scanner and directed toward the screen, when the subscanner and the main scanner are not scanning, the image on the projection screen is a stationary light spot, the shape and size of the light spot is determined by the geometry of the laser beam and the throw distance between the main scanner and the projection screen, when only the main scanner is scanning, the whole system functions as a conventional laser projector, when only the subscanner is scanning, it produces a dynamic image cell, having the shape of a straight line or a line diagram, at a fixed position on the projection screen, the size and shape of the dynamic image cell at any instant depends on the amplitude and speed of the subscanner in x and y directions, when the main scanner and the subscanner are scanning, the main scanner moves the dynamic image cell produced by the subscanner to different places on the screen, the shape and size of the dynamic image cell produced by the subscanner is essentially unaffected by the main scanner due to the substantially lower speed of the main scanner relative to the subscanner, the main scanner positioning the dynamic image cell at different places on the screen to produce complex diagrams and animation, or dragging and positioning the dynamic image cell on the screen as a light spot with varying size and shape to produce diagrams or light effects, whereby diagrams with texture, shading, and more complexity as well as better animation and more impressive light effects can be produced.

11. The laser projection system of claim 10 wherein the main scanner is comprised of two rotating mirrors, each mirror being rotated by a galvanometer.

12. The laser projection system of claim 10 wherein the subscanner has one or more electrooptic deflectors.

13. The laser projection system of claim 10 wherein the subscanner has one or more acoustooptic deflectors.

14. The laser projection system of claim 10 wherein the subscanner has one or more vibrational deflectors.

15. The laser projection system of claim 10 wherein the x and y axes are perpendicular to each other.

16. The laser projection system of claim 10 wherein the x and y axes have an arbitrary angle relative to each other.

* * * * *